(12) United States Patent
Bonin

(10) Patent No.: US 6,960,945 B1
(45) Date of Patent: Nov. 1, 2005

(54) HIGH-PERFORMANCE DRIVE CIRCUITRY FOR CAPACITIVE TRANSDUCERS

(76) Inventor: Wayne Bonin, 21 Black Oak Rd., Saint Paul, MN (US) 55127

( * ) Notice: Subject to any disclaimer, the term of this patent is extended or adjusted under 35 U.S.C. 154(b) by 0 days.

(21) Appl. No.: 10/848,710

(22) Filed: May 17, 2004

Related U.S. Application Data

(60) Provisional application No. 60/470,664, filed on May 15, 2003.

(51) Int. Cl.[7] .............................................. H03B 1/00
(52) U.S. Cl. ..................................................... 327/111
(58) Field of Search ......................... 327/99, 108, 111, 327/182; 324/661; 73/862.626, 862.628, 73/658; 361/718–720, 728, 731, 734–736, 361/748

(56) References Cited

U.S. PATENT DOCUMENTS 4,584,885 A * 4/1986 Cadwell .................. 73/862.61
5,343,766 A * 9/1994 Lee .......................... 73/862.61

* cited by examiner

Primary Examiner—My-Trang Nu Ton

(57) ABSTRACT

Drive circuitry for capacitive displacement transducers includes an oscillator, a precision low noise voltage reference with added noise reduction circuitry, a synchronous demodulator consisting of a single pole double throw analog switch, one or more transducer electrode drive signals generated by one or more additional analog switches, and feedback circuitry to modify the amplitude of the electrode drive signal based on the circuit output signal, to improve the accuracy of the output signal.

42 Claims, 9 Drawing Sheets

HIGH-PERFORMANCE DRIVE CIRCUITRY FOR CAPACITIVE TRANSDUCERS

CROSS-REFERENCE TO RELATED APPLICATIONS

This application claims the benefit of PPA Ser. No. 60/470,664, filed May 15, 2003 by the present inventor.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention relates to electronic circuitry used to operate capacitive transducers, for example for use in displacement and force-responsive devices.

Capacitive transducers use various configurations of capacitor electrodes along with springs, diaphragms or other support mechanisms to sense acceleration, force, weight, pressure, displacement or position. Capacitive transducers have much higher output signal than strain gauge transducers, giving them a potential advantage in signal to noise ratio (SNR) and reduced susceptibility to drift, but capacitive transducers also generally have a much higher impedance than strain gauge transducers. The higher impedance will degrade the SNR-if the circuitry is not optimized for the high impedance transducer.

Many possible circuits may be used to convert the change in transducer capacitance to a voltage that represents the desired function being measured. This invention relates to circuitry which uses an AC carrier or drive signal applied to one or more of the electrodes, and synchronously demodulates the signal on the pickup electrode to remove the carrier frequency and convert the output to a DC voltage that is representative of the electrode spacing. Ideally the output voltage is a linear function of the electrode spacing or deflection, and is not effected by anything other than the electrode spacing. In practice there are many factors that tend to introduce errors to the output voltage, such as temperature sensitivities in gain and offset voltage, non-linearity, and noise.

U.S. Pat. No. 4,694,687 to Bonin et al. (1987) describes circuitry used with a three plate capacitive accelerometer. This circuitry is typical of that used for other purposes, such as force and displacement measurement as well. This circuitry is simple and inexpensive, and performs quite well for low to medium performance applications, but has significant limitations for high performance applications requiring linearity accuracy of better than 1%, or resolution of better than 1 part in 100,000 of the full scale output.

The first source of non-linearity in capacitive transducers is due the fact that the capacitance between parallel plate electrodes varies as the reciprocal of the electrode spacing, rather than in a linear manner. This creates an inherent non-linear behavior for transducers where an outer electrode moves with respect to the other electrodes. For transducers with a movable center pickup electrode relative to two fixed outer drive electrodes this source of non-linearity is eliminated, as the two non-linear changes cancel each other, resulting (in theory) in a perfectly linear function of output voltage versus center electrode position. In practice, parasitic capacitance at the amplifier input, and non-parallelism of the electrodes contribute to non-linearity. U.S. Pat. No. 5,006,962 to Thomas (1991) discloses a feedback mechanism that servos the pickup electrode voltage to zero by adjusting the drive voltage based on the output voltage which has the effect of reducing the sensitivity to parasitic capacitance. Unfortunately the means' of implementing this disclosed by Thomas are rather complicated and expensive, using up/down counters in combination with digital to analog converters in some cases, and transformers in other cases.

To minimize noise in capacitive transducers, it is desirable to operate them at a relatively high frequency, as the higher the frequency the lower to impedance of the transducer. It is also desirable to synchronously demodulate the pickup electrode signal in a manner that rejects interference type noise that may be picked up from nearby equipment. This interference rejection is accomplished by demodulating the pickup electrode signal into two channels, one channel representing the signal during the first 180 electrical degrees of the drive signal period, and the other channel representing the pickup electrode signal during the second 180 electrical degrees of the drive signal period. Re-combining the two channels by means of a differential amplifier will reject the interference, which appears as a common mode signal as long as it is at a lower frequency than the carrier drive frequency. Bonin discloses a synchronous demodulator that acts as a half wave rectifier, producing only one channel, so that the common mode interference noise cannot be rejected. Thomas discloses circuitry that rejects the common mode interference as described above, but in a more complicated manner involving splitting the signal from the pickup electrode into two channels prior to synchronous demodulation by connecting one channel to an inverting amplifier. This adds a delay to one channel, so that when they are re-combined, the two channels will not match up in time properly, unless the frequency is relatively low, which increases the overall noise of the device due to the higher impedance of the transducer. An alternative circuit also disclosed by Thomas uses an analog multiplier to demodulate the pickup electrode signal. This also rejects the common mode interference, but analog multipliers are expensive components, and being active devices, are an additional noise source themselves, and suffer from gain and offset drifts due to their temperature sensitivity.

The capacitive sense circuitry commonly used in the art, such as described in Bonin, also suffers from feed through of power supply noise to the output signal. This is because the drive electrode signal is obtained by switching between the power supply voltage and ground, or another power supply voltage. This causes the drive signal amplitude to directly follow the power supply voltage, with any ripple or variation in the power supply appearing on the drive signal as well. Since the output voltage of the transducer is proportional to the drive signal amplitude, this causes the power supply noise to show up at the transducer output. For many common uses, this may not be a problem, but in order to achieve the extremely low noise that capacitive transducers are inherently capable of, and is required for high precision measurement instruments, it is necessary to eliminate this source of noise. Thomas indicates the use of a voltage reference, but does not give any indication of any particular requirements regarding noise of the reference. Even voltage references advertised as being precision devices typically have an output voltage noise of 30 to 100 $\mu V_{pp}$, which can easily be the dominant noise source in the circuit.

BRIEF SUMMARY OF THE INVENTION

The present invention provides a circuit for use with capacitive transducers. It is particularly suitable for transducers with parallel plate electrodes, which operate by changing the relative spacing between the plates. By changing a few components in the circuit, operation may be optimized for different transducer configurations, such as three electrode with a moving center electrode and fixed outer electrodes, or a moving outer electrode with the other two electrodes fixed. It may also be used with a two electrode transducer, by substituting a commercial component type capacitor for one of the electrodes.

An object of the invention was to create a circuit that would have the lowest possible noise, so that the transducer resolution would be at least 1 part in 1,000,000. Other objects of the invention were to minimize the physical size, cost, and power dissipation of the circuit.

Noise was minimized by several means. One means is by using a very low noise voltage reference integrated circuit (IC) with special filtering to limit the reference noise to about 3 $\mu V_{pp}$. Other means include operating the buffer amplifier at a gain of 10 to minimize the effect of noise in components in the signal path after the buffer amplifier, using an analog switch to synchronously demodulate the pickup electrode signal rather than an analog multiplier which adds noise, using a differential amplifier with a high common mode rejection ratio (CMRR) to reject electrical interference noise picked up by the transducer from other equipment, and choosing components and circuit configuration allowing the drive signal frequency to equal or exceed 1 MHz, to reduce the impedance of the transducer.

Size and cost were minimized by using standard, readily available surface mount components. No expensive and/or bulky components such as transformers or analog to digital converters were used. In order to minimize the transducer drift caused by heat from the circuit, only a few key components were located at the transducer. These components were mounted on a printed circuit board of 12.5 mm by 15 mm dimensions, which included electrical receptacles that mate with pins in the transducer. This allowed the circuit to plug directly into the transducer, with less than 5 mm distance between the transducer electrodes and the buffer amplifier. All components that could be situated remotely from the transducer without degradation in the circuit performance were placed on a second circuit board, and connected to the first circuit board by a flexible cable.

DETAILED DESCRIPTION OF THE INVENTION

Before considering the circuit of this invention, an understanding of the prior art circuits, and the transducers used with them is helpful. The circuitry presented here operates with two variations of three electrode capacitive transducers. Transducer 10A shown in FIG. 1A has a first drive electrode 12, a second drive electrode 13A, and a pickup electrode 11. Pickup electrode 11 is located between drive electrodes 12, 13A and is movable with respect to the two drive electrodes. Drive electrode 13A is shown with a hole to permit passage through it by probe tip 14. Probe tip 14 interacts with a surface or sample being tested (not shown), and transmits force or displacement between the sample and pickup electrode 11. It is also possible to extend pickup electrode 11 out the side past the drive electrodes, in which case a hole is not required. In the case of an accelerometer, force is applied to pickup electrode 11 directly by the acceleration and neither the hole nor the extension are required. Transducer 10B shown is FIG. 1B has a drive electrode 12, a pickup electrode 11 and a target electrode 13B which is movable with respect to the drive and pickup electrodes. Target electrode 13B is most commonly grounded.

It should be understood both here and in the claims that the phrase "movable with respect to" also includes the case where the electrodes described as "fixed" are moving with respect to some reference frame, and the electrode or electrodes described as "movable with respect to" are fixed with respect to some reference frame. It is only the relative motion between the electrodes in the transducer that effect the output of the transducer. It makes no difference whether the outer two electrodes are fixed and the inner electrode moves, or the inner electrode is fixed and the outer electrodes move. There is a significant difference in the operating characteristics, however, between one outer electrode being movable with respect to the other two electrodes, and the center electrode being movable with respect to the outer two electrodes.

Figure 1A:
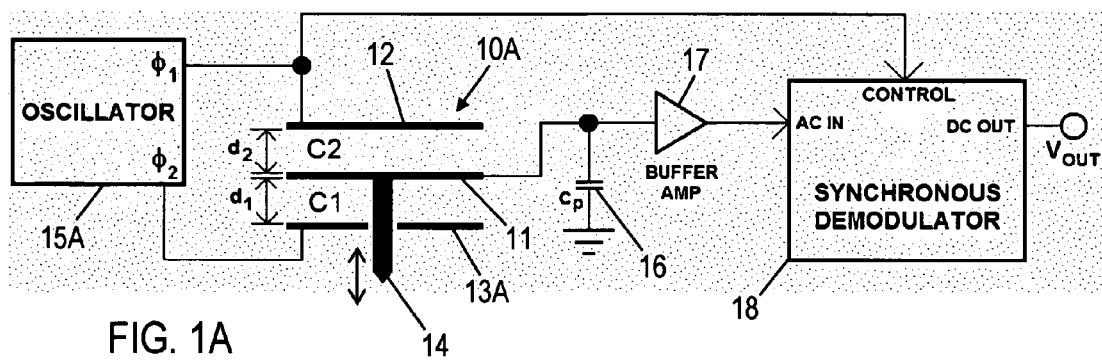
FIG. 1A shows a prior art circuit for use with capacitive transducers with two fixed outer drive electrodes and a movable centrally located pickup electrode.

Both circuits operate in a very similar manner. In FIG. 1A, oscillator 15A has two output signals. The output signals are generally square waves, although sinusoids or other shapes could be used. The two output signals are 180 electrical degrees out of phase with respect to each other, so that when one is high the other is low and vice versa. One oscillator output is applied to drive electrode 12 and the other oscillator output is applied to drive electrode 13A. When pickup electrode 11 is perfectly centered between the drive electrodes, so that distance $d_1$=distance $d_2$, the capacitance C2 between drive electrode 12 and pickup electrode 11 is equal to the capacitance C1 between drive electrode 13A and pickup electrode 11. This results in no signal being imparted on pickup electrode 11, since the drive signals from oscillator 15A are equal in amplitude but opposite in polarity. As pickup electrode 11 moves one way or the other, as indicated by the double headed arrow next to probe tip 14, the distances between the electrodes is not equal, and capacitance C1 is not equal to C2. This results in an AC signal having the same frequency as oscillator 15A being imparted on pickup electrode 11, as the drive electrode closer to pickup electrode 11 will transfer more charge than the farther electrode at each transition of oscillator 15A. The signal on pickup electrode 11 is an amplitude modulated (AM) AC waveform with a carrier frequency equal to the oscillator frequency, and phase-locked with the oscillator. As used here, the term AC covers signals with a varying or alternating voltage, as well as a varying, or alternating current, in accordance with accepted modern usage of the term. The amplitude of the signal on the pickup electrode is proportional to the displacement with respect to the drive electrodes, and the phase of the pickup electrode signal with respect to the drive signals from oscillator 15A depends on the direction of the displacement. The phase is either 0 or 180 electrical degrees, and shifts from one to the other as the pickup electrode moves through the exact center position, and the signal amplitude goes through zero. Buffer amplifier 17 has a high input impedance and low output impedance and is required to prevent excessive loading on pickup electrode 11 which would occur if pickup electrode 11 were connected directly to synchronous demodulator 18. Synchronous demodulator 18 acts as a phase sensitive rectifier, converting the AC input signal from the output of buffer amplifier 17 to a DC signal with a polarity depending on the direction of displacement of pickup electrode 11 and an amplitude depending on the amount of displacement.

Parasitic capacitance 16 is not a deliberately added circuit component. It is an undesired but unavoidable part of the circuit consisting of the input capacitance of buffer amplifier 17 and stray capacitance of the wiring between pickup electrode 11 and buffer amplifier 17. Even as low as 1/10 the transducer capacitance C1+C2, the parasitic capacitance creates significant non-linearity in the output signal. Without the parasitic capacitance, the output signal would be a linear function of the displacement of pickup electrode 11.

Figure 1B:
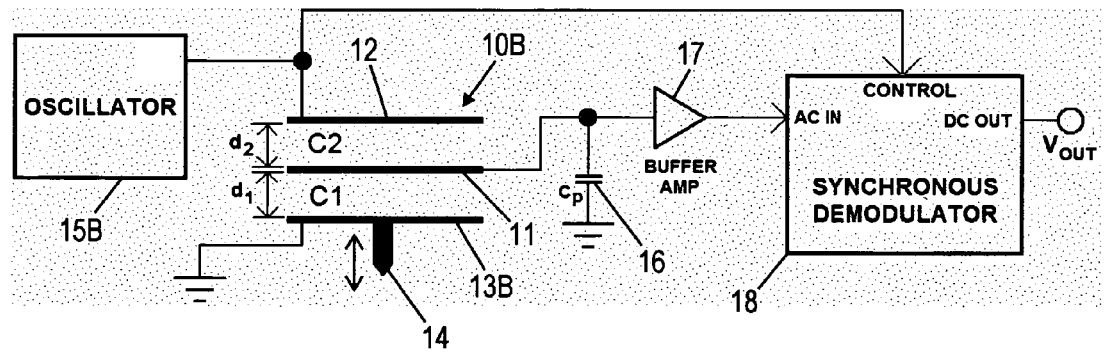
FIG. 1B shows a prior art circuit for use with capacitive transducers with a fixed outer drive electrode, a fixed centrally located pickup electrode and a movable outer grounded target electrode.

In FIG. 1B, the circuit is the same as in 1A except that oscillator 15B has only one output. In the transducer 10B, pickup electrode 11 is centrally located between drive electrode 12 and target electrode 13B, but pickup electrode 11 is now fixed with respect to drive electrode 12. Grounded target electrode 13B is movable with respect to the other two electrodes. The circuit operates in the same manner as the previous one, with somewhat different output characteristics due to the different drive signals and relative electrode motion. The output voltage is a single polarity, and goes to zero as the space $d_1$ between target electrode 13B and pickup electrode 11 goes to zero. The output signal approaches the amplitude of oscillator 15B as the spacing $d_1$ becomes very large with respect to $d_2$. The advantage of having the moving part of the transducer more easily accessible by being on the outside, and grounded so that it does not need to be electrically isolated from the sample, comes at the cost of the very non-linear output versus displacement relationship shown in FIG. 2.

Figure 3:
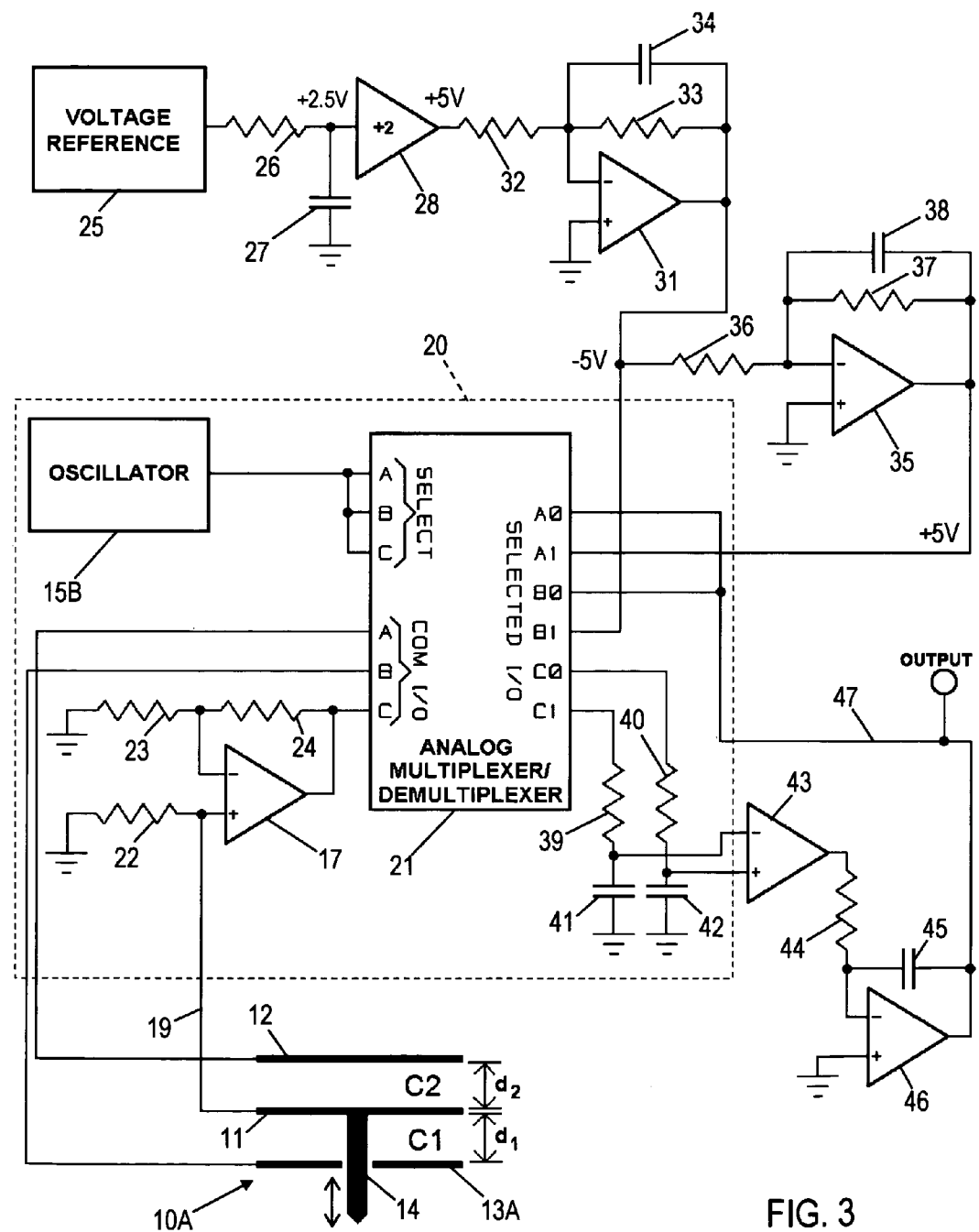
FIG. 3 shows a first embodiment of the circuit of this invention, configured to operate with transducers with fixed outer drive electrodes and a movable centrally located pickup electrode.

A first preferred embodiment of the circuit of the present invention is shown in FIG. 3. In order to avoid excessive clutter in the drawing, standard circuit elements well known to those skilled in the art, such as bypass capacitors and power supply connections, have been left out of the drawing to more clearly show the important elements pertinent to the disclosed improvements. Before discussing the improvements in more detail, an understanding of the operation of the circuit is necessary.

Analog multiplexer/demultiplexer 21 is an integrated circuit three channel single pole double throw analog switch, referred to from now on as switch 21. Switch 21 is controlled by the three SELECT inputs A, B, C, which are all connected to oscillator 15B. When SELECT input A is low, COM I/O (for common input/output) A is connected internally to SELECTED I/O (for selected input/output) AØ and when SELECT input A is high, COM I/O A is connected internally to SELECTED I/O A1. The other two channels of switch 21 are controlled in an equivalent manner by SELECT inputs B and C. Voltage reference 25, along with amplifiers 28, 31 and 35 provide a +5 volt fixed voltage level to SELECTED I/O A1 of switch 21 and a −5 volt fixed voltage level to SELECTED I/O B1 of switch 21. Other voltages may be used in special circumstances, but +5 and −5 volts is generally preferred.

The amplitudes of the drive signals applied to transducer drive electrodes 12, 13A are equal to the difference between the fixed levels of +5V at SELECTED I/O A1 of switch 21 and −5V at SELECTED I/O B1, and the feedback signal generated by amplifier 46, which is also used as the output signal, 47. At the initial moments of circuit operation, the feedback signal from the output of amplifier 46 is zero due to capacitor 45 being discharged, so the amplitude of both drive signals is 5V and there is a 180 degree phase difference between the two. This creates a signal on pickup electrode 11 of transducer 10A which is proportional to the displacement of the pickup electrode from the center position between outer drive electrodes 12, 13A. This pickup signal is amplified by buffer amplifier 17, converted to a differential DC signal stored on signal storage capacitors 41, 42 by channel C of switch 21, which functions as a synchronous demodulator, and then converted to a single ended DC voltage by differential amplifier 43. This signal from differential amplifier 43 is then integrated by resistor 44/capacitor 45/amplifier 46. The purpose of series resistors 39, 40 are to ensure that the voltage stored on signal storage capacitors 41, 42 is the average voltage over the half cycle of oscillator 15B that each is connected to the respective output CØ or C1 of switch 21. Without the resistors, the voltage stored on 41, 42 would be subject to corruption by switching spikes at the output of buffer amplifier 17, which occur during the switching transitions of oscillator 15B.

To see how the position of pickup electrode 11 determines the output signal, assume that pickup electrode 11 is perfectly centered between the drive electrode 12 and drive electrode 13A, and that the output/feedback signal 47 is zero volts. With oscillator 15B output low, the COM I/O terminals A, B, and C of switch 21 are connected to SELECTED I/O terminals AØ, BØ, and CØ respectively. Since AØ and BØ of IC4 are both connected to output/feedback signal 47, which is zero volts, both drive electrodes of transducer 10A are at zero volts and the output of buffer amplifier 17 is connected via switch 21 terminal CØ to signal storage capacitor 42 via resistor 40. When the output of oscillator 15B goes high, the internal connections within switch 21 between COM I/O terminals A, B, and C and SELECTED I/O terminals AØ, BØ, and CØ are opened, and connections made from COM I/O terminals A, B, and C to SELECTED I/O terminals A1, B1, and C1. This causes the drive voltage at drive electrode 12 of transducer 10A, which is driven by COM I/O terminal A of switch 21, to switch from zero to +5V, and the voltage at drive electrode 13A of transducer 10A, which is driven by COM I/O terminal B of switch 21, to switch from zero to −5V. The switching of both drive voltages is synchronized in time with the output signal of oscillator 15B. Since the spacings $d_1$ and $d_2$ between the electrodes of transducer 10A are equal, the capacitance C2 between drive electrode 12 and pickup electrode 11 is equal to the capacitance C1 between drive electrode 13A and pickup electrode 11. Since the capacitance between each drive electrode and the central pickup electrode is equal, no net charge is transferred to the pickup electrode. The charge transferred from the positive going drive electrode 12 is canceled by the opposite charge transferred by the negative going drive electrode 13A. With no charge transfer to the central pickup electrode there is no voltage change on the central electrode, so the voltage stored on signal storage capacitor 41, which is now connected to the output of buffer amplifier 17 by the internal connection between COM I/O terminal C and SELECTED I/O terminal C1 of switch 21, is the same as the voltage stored on signal storage capacitor 42, which was previously connected to the output of buffer amplifier 17 by the internal connection between COM I/O terminal C and SELECTED I/O terminal CØ of switch 21. With both inputs at the same value, the output voltage of differential amplifier 43 is zero, and so the output of integrator 46 remains at zero volts.

Now assume that pickup electrode 11 is deflected downward, so that it is closer to drive electrode 13A. When oscillator 15B switches from low to high, causing the SELECTED I/O connections of switch 21 to change from AØ, BØ, and CØ to A1, B1, and C1, a net negative charge will be transferred to pickup electrode 11, since drive electrode 13A with a negative 5V potential change is closer to pickup electrode 11 than drive electrode 12 with a positive 5V potential change. This net negative charge decreases the voltage on pickup electrode 11, which decreases the voltage at the output of buffer amplifier 17, and finally decreases the voltage on signal storage capacitor 41, so that the voltage on signal storage capacitor 41 is less than the voltage on signal storage capacitor 42. This causes the output of differential amplifier 43 to be positive, causing the output of integrator 46 to decrease, since it is an inverting integrator. This reduces the voltage change on drive electrode 13A which switches between −5V and output/feedback voltage 47, and increases the voltage change on drive electrode 12. The effect of this is to reduce the charge transfer to pickup electrode 11, and therefore to reduce the voltage change on the pickup electrode. The output/feedback voltage 47, of integrator 46 continues to change until the voltage change at pickup electrode 11 has been reduced to zero, which reduces the input voltage to integrator 46 to zero, causing the output of integrator 46 to hold steady at a constant value until pickup electrode 11 moves to a different position. Therefore, the feedback signal is part of a servo loop that is constantly adjusting the drive voltage amplitudes to force the pickup electrode voltage to zero. An upward deflection of the central pickup electrode reverses the polarity of the response, resulting in a positive output/feedback voltage 47. In either case, the magnitude of the output voltage is proportional to the amount of deflection of pickup electrode 11 away from the center between the two drive electrodes. This feedback method which adjusts the level of the drive electrode voltages to maintain the pickup electrode voltage at zero eliminates the non-linearity due to parasitic capacitance. Since the pickup electrode voltage is maintained at zero volts, the loading effect of the parasitic capacitance is eliminated. This feedback method of controlling the drive electrode voltage to maintain the pickup electrode voltage at zero to reduce non-linearity has been used previously by others, but prior art circuits have used larger and more costly components to generate the variable drive electrode voltages, such as transformers or extra differential amplifiers. The feedback also enables a significant reduction in both noise and DC offsets that were not known in the art.

This improvement is obtained by adding voltage gain in the buffer amplifier. With the prior art circuitry of FIG. 1A, the gain of buffer amplifier 17 set to 1. If the gain is greater than 1, buffer amplifier 17 will saturate at a deflection of center electrode 11 less than full scale. For example, if the gain is 10, the output will saturate at a pickup electrode displacement of just 1/10 of the nominal electrode spacing. In the circuit of the current invention, shown in FIG. 3, it is possible to increase the gain of the buffer amplifier because of the feedback loop that adjusts the drive electrode voltages to keep the pickup electrode voltage at zero. A gain of 10 has been found to give good performance. Adding gain at buffer amplifier 17 directly at the transducer output, pickup electrode 11, reduces the effect of noise and offset voltages in the demodulator section of switch 21, differential amplifier 43, and integrator 46 by the factor of the buffer amplifier gain. DC offsets in buffer amplifier 17 are not important (except in limiting the maximum possible gain before saturation) as they are removed by differential amplifier 43. Low frequency noise in buffer amplifier 17 acts in a similar manner to a DC offset and is attenuated by differential amplifier 43. The critical characteristics of buffer amplifier 17 are low input current noise and low input voltage noise at the frequency of oscillator 15B. A high gain-bandwidth product is also desirable, as that allows operation at a higher oscillator frequency, which reduces the impedance of the transducer, which reduces the effect of the amplifier input current noise and reduces the overall noise of the system.

To appreciate the effect of gain in the buffer amplifier stage on reducing overall noise, The variation of amplifier noise with frequency must be understood. Amplifiers suffer from a number of noise effects, and a very significant one for low frequencies (usually zero to about 100 Hz) is called 1/f noise, since it increases as the frequency decreases, at approximately the reciprocal of the frequency below a certain corner frequency. For buffer amplifier 17, the 1/f noise is not important, as the low frequency noise manifests itself after synchronous demodulation as a common mode voltage at the input of differential amplifier 43, which the differential amplifier rejects. The LT1363 from Linear Technology is a suitable part for buffer amplifier 17. It has a noise density per unit frequency of 9 nV/$\sqrt{Hz}$ above about 500 Hz. At 10 Hz the noise of the LT1363 is 60 nV/$\sqrt{Hz}$. Different devices may have more or less noise at any given frequency, but all standard op-amps have increasing noise density below some corner frequency. The key to reducing the effect of the 1/f noise in differential amplifier 43 and integrator 46 is to amplify the transducer signal from pickup electrode 11 prior to differential amplifier 43. With a gain of 10 in the buffer amplifier, the effect of noise, as well as input offset voltages that cause offset errors and temperature dependent drift, are all reduced by a factor of 10. The effect of any noise generated in the synchronous demodulator, channel C of switch 21, will also be reduced by 10 times. Values of gain greater than 10 were found to have only a small additional benefit in reducing noise. The gain of buffer amplifier 17 is set by the ratio of resistors 23 and 24, which may be 110 and 1000 ohms, respectively, for the preferred gain of 10. Resistor 22 is required to supply bias current to the input of buffer amplifier 17, as the transducer is open circuit at DC and cannot supply any bias current. A value of 1,000,000 ohms is suitable for resistor 22.

Selection of differential amplifier 43 is important to ensure that it provides the high Common Mode Rejection Ratio (CMRR) required, both to reject the low frequency 1/f noise of buffer amplifier 17, and also to reject low frequency interference type noise, such as 60 Hz power line noise, as is likely to be picked up by the pickup electrode, due to the high impedance of the pickup electrode and the ubiquity of power line operated electrical equipment. A CMMR of about 1000 has been found to generally reduce the pickup of 60 Hz interference to about the level of the other noise sources. An LT1168 instrumentation amplifier from Linear Technology requires no extra components when used at a gain of unity, and provides a CMMR of about 10,000. It is also possible to use an assembly of three operational amplifiers and four resistors in a configuration that is well known to those skilled in the art, in which case the four resistors should be matched with a precision of 0.1% to ensure a CMRR of 1000. The term "low frequency" as used here is relative to the frequency of oscillator 15B, so that for an oscillator frequency of 1 MHz, an interference frequency of up to 10,000 Hz, or even 100,000 Hz, would still be considered low.

The frequency of oscillator 15B may be any frequency within a wide range, but best performance is obtained at a suitably high frequency. For the circuitry shown in FIG. 3, the noise level is considerably reduced when operating at an oscillator frequency of 1 MHz, versus 100 KHz. Operation at 3 MHz gave a small improvement over 1 MHz, but operating at 10 MHz gave poor results as this frequency was too close to the limit of the buffer amplifier and synchronous demodulator.

Another improvement included in the first preferred embodiment shown in FIG. 3 is the voltage reference. The voltage reference is a source of noise that is often completely overlooked, or given only cursory attention at best, yet it is often the most significant noise source of all. The power supply used to operate the circuitry is commonly used for the reference voltage as well in capacitive transducer circuitry known in the art. General purpose power supplies typically have ripple and noise of several mV or greater. Even high quality laboratory supplies typically have ripple and noise at several hundred microvolts. The full scale output noise of the transducer cannot be less than the noise of the reference voltage, so this much noise can swamp out all other factors. For example, assuming that the buffer amplifier input voltage noise is 9 nV/$\sqrt{Hz}$, and that the total signal bandwidth is 1000 Hz, the total noise contribution from the buffer amplifier is (9 nV)*($\sqrt{1000}$)=0.28 $\mu V_{rms}$. If as is typically the case, a standard power supply with a noise level of several hundred microvolts rms were used instead of a low noise voltage reference, the resolution of the transducer will be degraded below its potential by three orders of magnitude.

One of the best devices available for voltage reference 25 is the ADR421 from Analog Devices, an ultraprecision low noise 2.5V reference. The total noise from 0.1 to 10 Hz is only 1.75 $\mu V_{pp}$, which after dividing by 6 to convert to RMS gives 0.292 $\mu V_{rms}$. Multiplying by 2 (to get the desired 5V reference level) gives 0.583 $\mu V_{rms}$. Although this is the best device that could be located, the noise level of the reference over the 0.1 to 10 Hz frequency range is still over twice as great as the noise level of buffer amplifier 17. Even worse, the noise of the voltage reference is not limited to the frequency range of 0.1 to 10 Hz. Above 10 Hz, the noise level is specified as 80 nV/$\sqrt{Hz}$, which gives an additional RMS noise level of (80 nV)*($\sqrt{990}$)=2.52 $\mu V_{rms}$ at the 2.5V output level of the reference, or 5.03 $\mu V_{rms}$ at the desired 5V level after amplification. This gives a total reference noise from 0.1 to 1000 Hz of 5.06 $\mu V_{rms}$ (uncorrelated noise adds by root sum of squares, not simple addition), which is 5.06/0.28=18 times worse than the amplifier noise.

Resistor 26 and capacitor 27 form a low pass filter to reduce the noise of voltage reference 25 by restricting the bandwidth to the range of DC to a few Hz. Suitable values for these components are 1,000,000 ohms for resistor 26 and 0.1 $\mu F$ for capacitor 27. These component values limit the bandwidth to the cutoff frequency of the filter of 1.6 Hz. The so called noise bandwidth is 1.57 times the cutoff frequency for a single pole filter, as frequency components about the cut off frequency are not totally eliminated, but are eliminated to a greater and greater extent the higher the frequency is above the cutoff frequency. 1.6 Hz times 1.57 is 2.5 Hz, and noise is proportional to the square root of the bandwidth (for a constant noise density per unit frequency), so the noise from the voltage at capacitor 27 would be about 0.292/$\sqrt{(10 Hz/2.5 Hz)}$=0.146 $\mu V$ RMS. The 1,000,000 ohm resistor contributes its own noise of 129 nV/$\sqrt{Hz}$ times $\sqrt{2.5 Hz}$=0.204 $\mu V$, and adding the two noise terms (as root sum of squares) gives 0.251 $\mu V$ RMS. Multiplying by 2 to convert the level from 2.5V to 5.0V (as is done by buffer amplifier 28) gives a noise of 0.50 $\mu V_{rms}$, about 10 times better than without the low pass filter to reduce the noise. Although the noise of the voltage reference is still about twice as great as the noise of buffer amplifier 17, it is hundreds of times better than the case without the low noise reference.

Selection of the type of dielectric for capacitor 27 is very important. If the dielectric is temperature sensitive, such as the common X7R and X5R ceramic materials, even very small temperature changes as may be caused by small air currents will cause fluctuations in the reference voltage at capacitor 27, which act in the same manner as electrical noise to corrupt the signal. NPO ceramic capacitors have excellent temperature stability, but the largest value easily available is 0.01 $\mu F$, which is only 1/10 of the desired value. The most suitable type overall was found to be a type ECH-U from Panasonic, which has a polyphenylene sulfide (PPS) dielectric. The 0.1 $\mu F$ device is available in a surface mount package of size 1210 (3.0 by 2.5 mm (0.12 by 0.10 inches) length and width). If even more filtering is desired, a type ECP-U (SF submicron) dielectric is also available from Panasonic. A 1.0 $\mu F$ device is available in the same 1210 size. The temperature stability is not quite as good as the PPS dielectric, but if the circuit is potted or otherwise shielded from temperature fluctuations it will work well. It should be noted that only temperature fluctuations with frequency components higher than the cutoff frequency formed by resistor 26 and capacitor 27 will significantly effect the output.

Buffer amplifier 28 is required to provide a low impedance output so that loading from subsequent stages does not effect the accuracy of the reference. To avoid loading the low pass filter formed by resistor 26 and capacitor 27, the input impedance of amplifier 28 must be much greater than resistor 26. A type TLC2201 amplifier from Texas Instruments is suitable, with the addition of two equal value resistors (not shown) to set the voltage gain to 2, one from the output to the inverting input and the other from the inverting input to ground, as is well known to those skilled in the art. Amplifier 28 is configured as a non-inverting amplifier, due to the requirement for a high impedance input. As is known to those skilled in the art, inverting amplifiers have in input impedance determined by the summing resistor at the input, which would make the input resistance much too low for this application. Non-inverting amplifiers have a drawback, however, in that the bandwidth cannot be limited as effectively as in an inverting amplifier. That is why two additional inverting amplifiers follow amplifier 28 and are used to provide the −5V and +5V reference signals to the inputs of switch 21. Amplifier 31, along with resistors 32, 33 form an inverting amplifier with a gain of negative one. Resistors 32, 33 are of equal value. Capacitor 34 is used to limit the bandwidth of amplifier 31 to avoid adding unwanted noise. Amplifier 31 applies a −5V reference voltage to switch 21 SELECTED I/O B1 for generating the transducer drive electrode voltage. Amplifier 35, along with resistors 36, 37 form a second inverting amplifier with gain of negative one, which converts the −5V output from amplifier 31 to +5V, and applies it to switch 21 SELECTED I/O $\mu$l, which is also used to generate the transducer drive electrode voltages. Capacitor 38 serves the same function as capacitor 34, that is to limit the bandwidth to minimize noise on the reference voltages.

The final improvement in the circuit relates to temperature and its effect on transducer 10A. Capacitive transducers (as well as other types) are temperature sensitive, due to thermal expansion induced changes is the electrode spacing. Heat from the transducer drive circuitry is generally the most significant source of this temperature change. This is especially noticeable in causing an objectionable change in the transducer output voltage as the drive circuit heats up when it is first turned on, generating so called "turn on drift". Turn on drift could be reduced by mounting the drive circuitry remotely from the transducer, so that its heat did not travel to the transducer, but that would increase problems with noise, due to the long connection 19 between amplifier 17 and pickup electrode 11. Due to the high impedance of this portion of the circuit, it should be as short as possible. Another conflicting item is the power consumption of the components. Lower power consumption reduces turn on drift. Unfortunately, due to the physics of semiconductor devices, low noise devices require higher power consumption than higher noise devices, as the noise of the input stage is reduced by operating at higher current. Therefore there is a conflict between low noise and low turn on drift. This invention eliminates the majority of the conflict by locating the majority of the heat generating components remotely from the transducer at one end of a cable, and only the critical high frequency and high impedance circuitry at the transducer. Dashed box 20 in FIG. 3 encloses the critical components resistors 22, 23, 24, 39, 40, amplifier 17, switch 21, oscillator 15B, and capacitors 41, 42, which should be located as near as possible to transducer 10A.

Figures 4, 5:
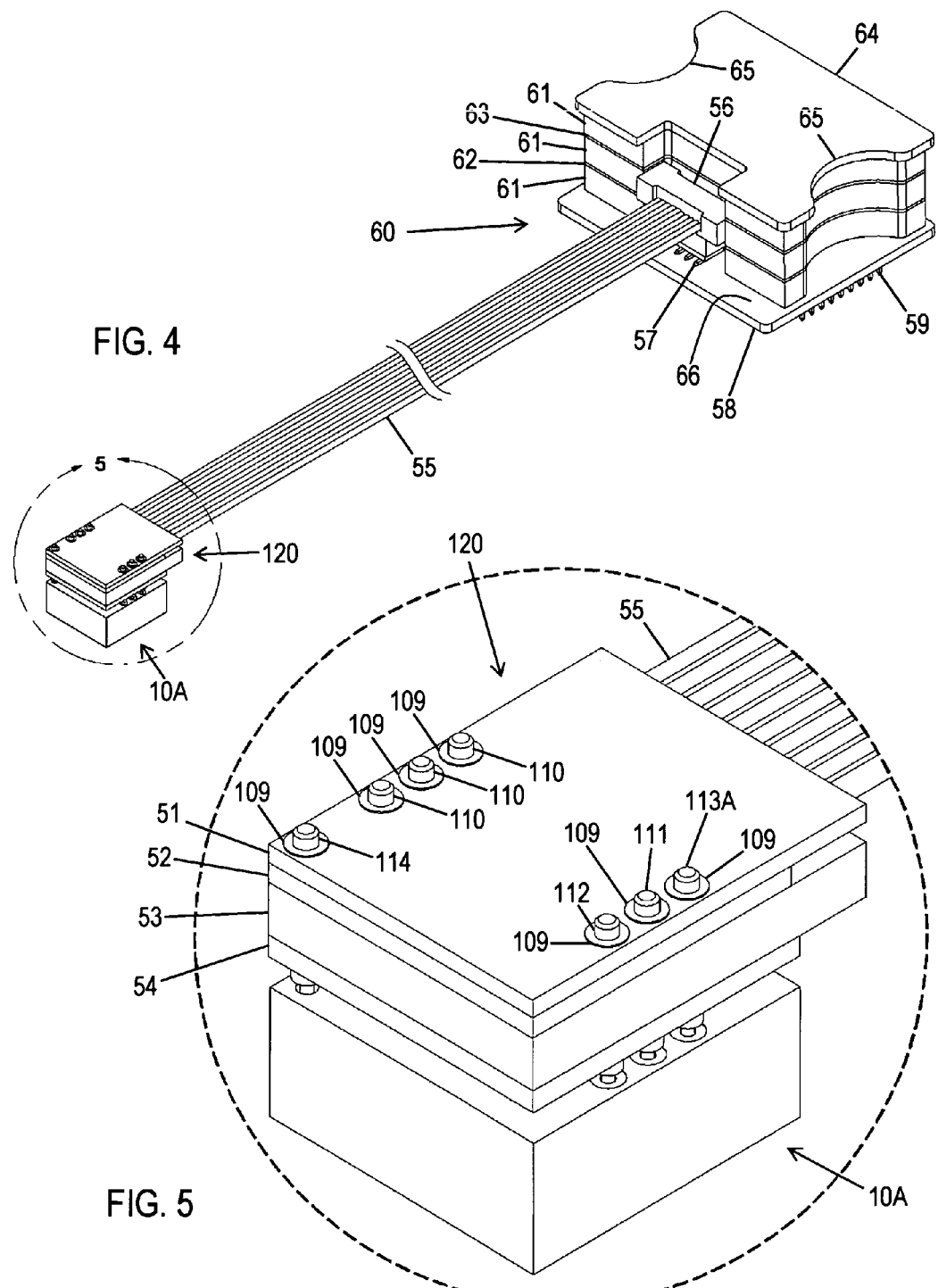
FIG. 4 shows the physical construction of the circuit.
FIG. 5 shows detail of the portion of the circuit attached to the transducer.
Figure 6:
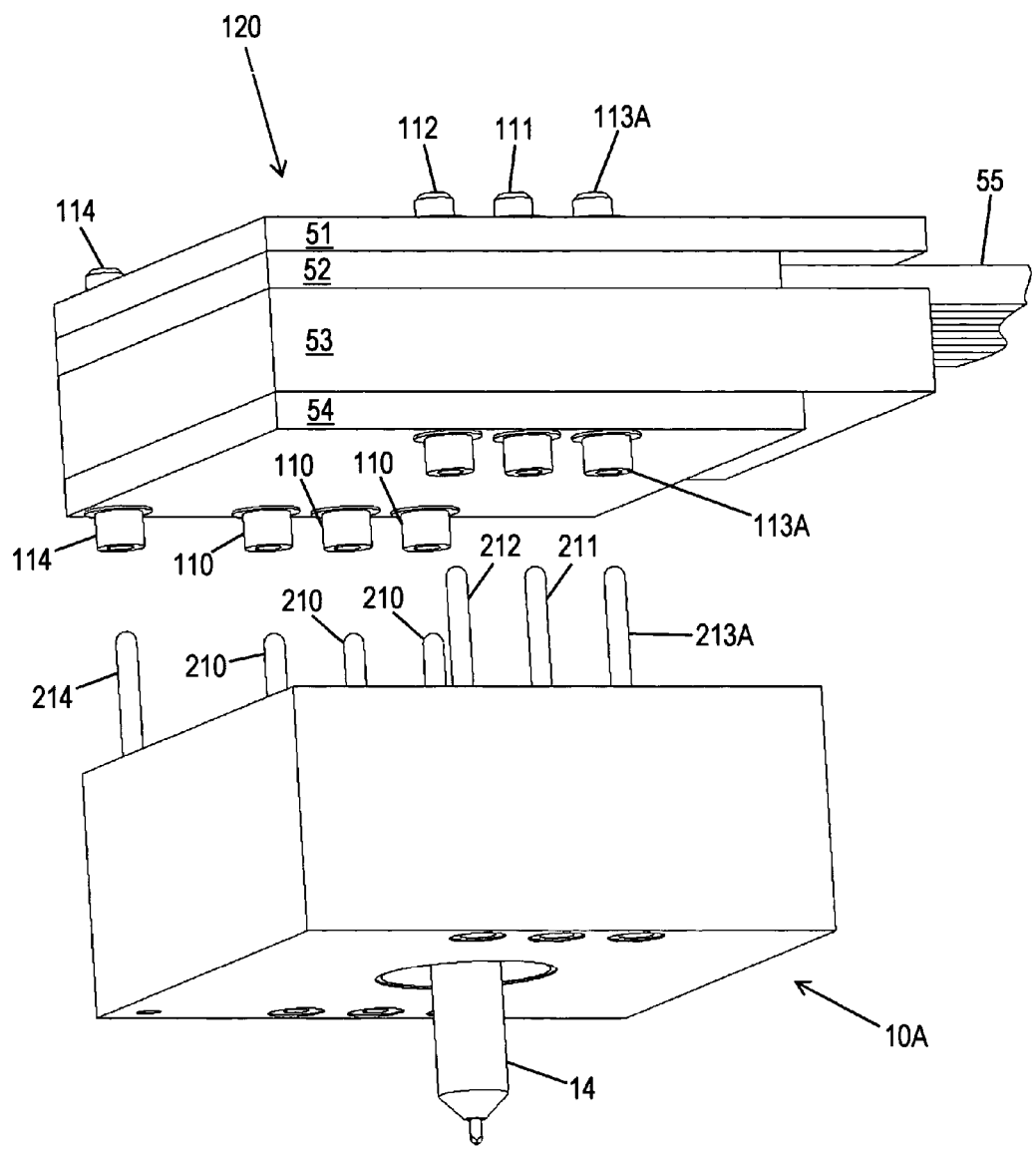
FIG. 6 shows an exploded view of the attachment of the circuit to the transducer.

FIGS. 4–6 show the physical layout of the circuit and transducer, which is a significant factor in the performance of the circuit, especially regarding turn on drift, and also regarding noise pickup. Circuit module 120 includes the components recited previously and enclosed by box 20 in FIG. 3. Cable 55 connects circuit module 120 with circuit module 60, which includes these components not included in circuit module 120. Since the amplifiers account for most of the power consumption, and only one of the total of 6 amplifiers are included in circuit module 120 at transducer 10A, about 83% of the heat responsible for turn on drift has been eliminated (that is, it is far enough away from the transducer 10A so as to have no effect on it). The spacing required to eliminate the effect of the heat from circuit module 60 on transducer 10A is only about 150 to 300 mm, but for convenience in positioning and operating transducer 10A, a longer length of 1 to 2 m is generally desirable. Due to the low impedance and relatively low frequencies of the signals transmitted by cable 55, there is no discernable deleterious effect for a cable length of 2 m. For simplicity, cable 55 is terminated at circuit module 60 with an insulation displacement connector IDC 56, which is pressed onto the cable without requiring any stripping or preparation other than cutting to the desired length.

IDC 56 plugs into header 57, which is soldered to copper pads on the upper surface of lower printed circuit board PCB 58 of circuit module 60. Header 59, soldered to the bottom of PCB 58, is used to attach module 60 to a power supply, and also connect the output signal to a readout device or computer data acquisition system, or other auxiliary equipment, as may be desired. To provide mechanical stability in mounting, or docking, module 60, a second header 59 (not visible) may also be positioned on the bottom of PCB 58 near the opposite edge from header 59 (visible) shown in FIG. 4. The electronic components included in circuit module 60 are placed on the upper surface of PCB 58 and on the bottom surface of PCB 62. The top surface of PCB 62 is used as a shield, in case additional circuitry, such as a high voltage amplifier (not shown) is included on optional PCB 63. Spacers 61 are hollow on the inside, having a wall thickness of about 0.75 mm so that most of the space inside of the spacers is available for the electronic components. The spacers serve to separate printed circuit board (PCB) 58, 62, 63 (if used), and cover 64 to provide the required clearance for the electronic components in the height dimension. The spacers also provide containment for epoxy or other potting compound which may be used to fill the interior of module 60 in order to provide improved thermal stability for capacitors 27, 34, and 38. The potting epoxy may be injected into the interior of module 60 through a hole (not shown) in cover plate 64 or PCB 58. Large syringes with blunt needles are readily available for this purpose. The sides of cover plate 64 extend slightly past spacers 61 and PCB 62, 63 by a small distance, such as 0.6 to 1.2 mm, in order to facilitate gripping module 60 securely when docking or undocking it. Curved indents 65 in cover plate 64, spacers 61, and PCB 62, 63, provide room for the operators fingers to grip module 60, when several modules are docked closely side by side. Any components for which adjustability or a change in value after the module is potted is desired, such as resistor 44 and capacitor 45, which control the bandwidth of the circuit, may be placed on the bottom of PCB 58, or on the top, but outside of spacer 61, as in the region of shelf 66. If minimizing the length and width of module 60 is not required, all of the electronic components may be mounted on PCB 58, so that the module does not require PCB 62, except for shielding in case additional circuitry is included.

FIG. 5 shows an enlarged view of module 120 and transducer 10A. FIG. 6 is an exploded view of FIG. 5 from a slightly different angle to show more clearly how transducer 10A attaches to circuit module 120. Transducer 10A contains a number of electrical connector pins 210, 211, 212, 213A, and 214. Pins 211, 212, and 213A connect to electrodes 11, 12, and 13A respectively, of transducer 10A. Pin 214 may connect to shield layers (not shown) in transducer 10A. Pins 210 are desirable for a stable mechanical connection between transducer 10A and circuit module 120, the mechanical connection being made by the electrical connector pins. Pins 210 may also be use to transmit additional signals, such as high voltage for electrostatic actuation, to additional electrodes (not shown) in transducer 10A. Pins 210, 211, 212, 213A, and 214 plug into corresponding receptacles 110, 111, 112, 113A, and 114, which are inserted and soldered into circuit module 120. The receptacles are soldered to plated through via holes 109, which may be used to connect to circuitry on either side of PCB 51. The receptacles extend all the way through circuit module 120, and are soldered to plated through via holes in PCB 54 as well. Cable 55 is soldered directly to copper pads (not shown) on the bottom surface of PCB 51. Spacer 52, 53 are hollow, with walls about 0.38 to 0.75 mm thick, except that spacer 53 is solid directly under cable 55. Spacer 52 is shorter than PCB 51 and spacer 53, so that cable 55 is sandwiched between PCB 51 and spacer 53, as can be seen in FIG. 6. This provides strain relief to prevent the soldered connections from cracking due to the stress from normal flexing of cable 55. Cable 55 is preferably a flat cable of the type commonly known as "ribbon cable". Potting epoxy injected into the interior of circuit module 120 through a hole (not shown) in either PCB 51 or PCB 54 increases both the mechanical and electrical stability of the assembly.

Amplifiers 31, 35, and 46 may be type LT1630 from Linear Technology. Resistors 32, 33, 36, 37 may be 20,000 ohms. Capacitors 34, 38 may be 1.0 $\mu$F type ECP-U dielectric from Panasonic. Switch 21 may be type 74HC4053 from Texas Instruments. Oscillator 15B may be a type LTC1799 from Linear Technology. Resistor 44 may be 10,000 ohms, capacitor 45 may be 0.01 $\mu$F. The output signal polarity may be reversed by reversing the transducer drive electrode connections.

Figure 2:
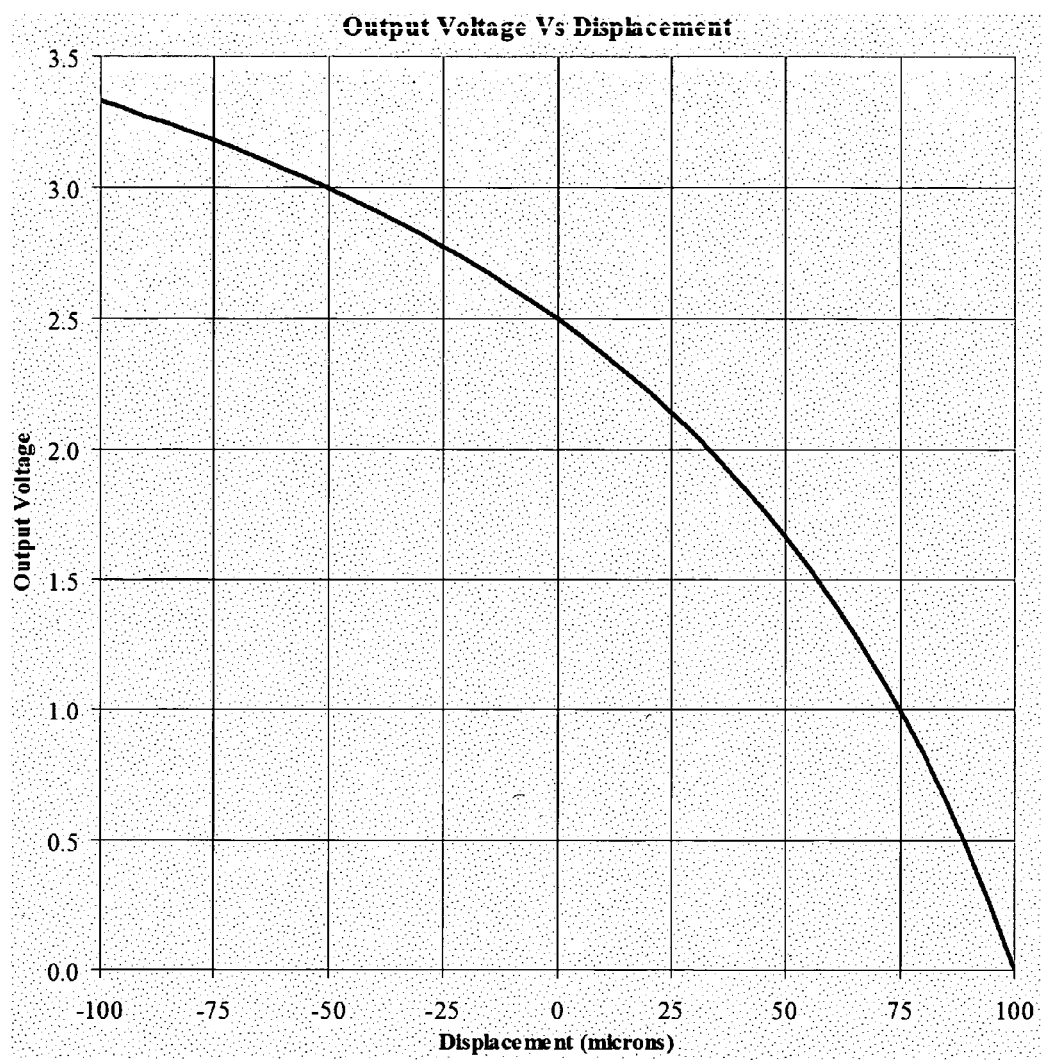
FIG. 2 shows the non-linear relationship between output voltage and target electrode displacement for the circuit shown in FIG. 1B.
Figure 7:
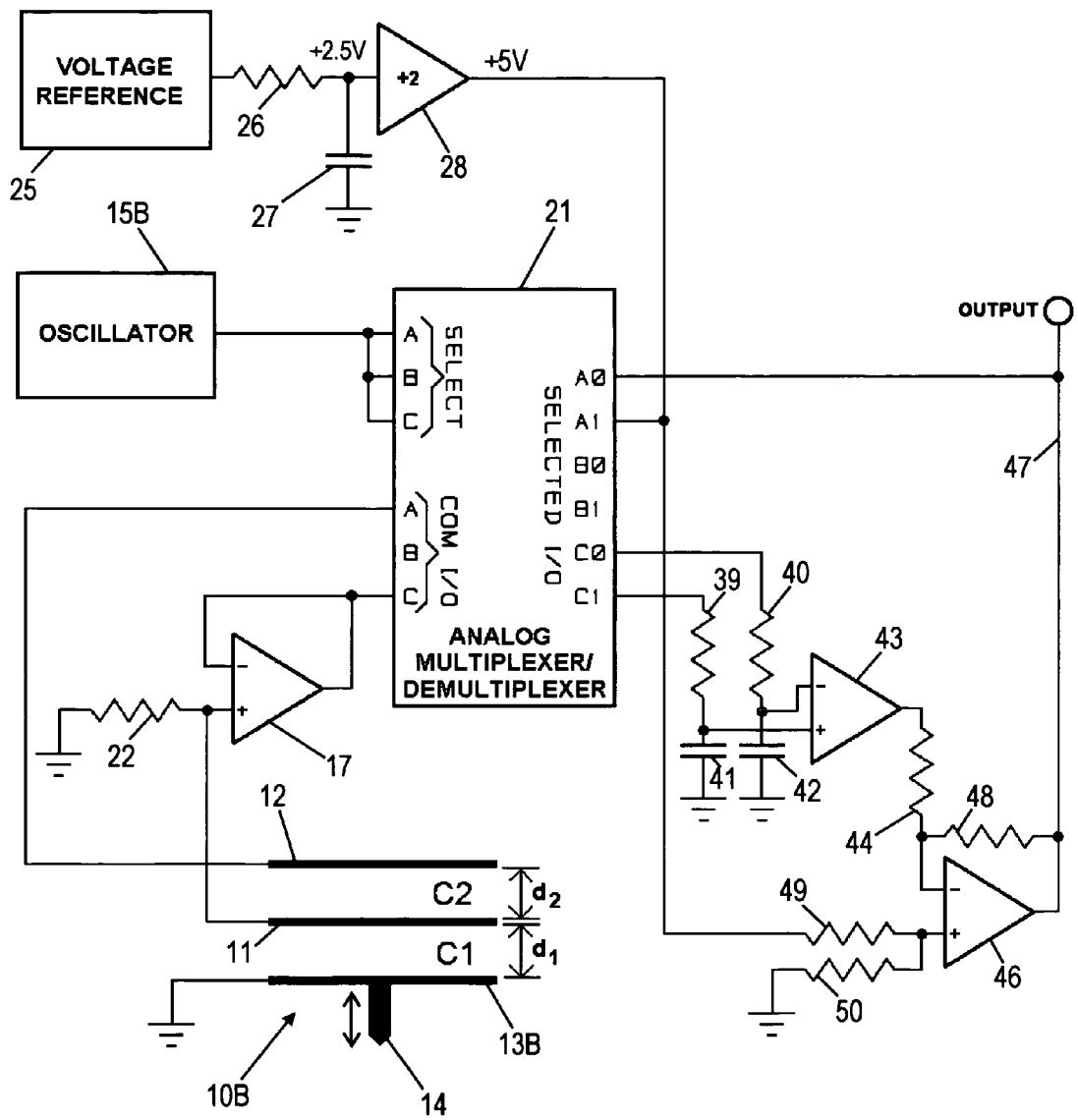
FIG. 7 shows a second embodiment of the circuit of this invention, configured to operate with transducers with a fixed outer drive electrode, a fixed centrally located pickup electrode and a movable outer grounded target electrode.

Referring now to FIG. 7, a second preferred embodiment of the circuit is described. This embodiment is optimized for use with a transducer which has a movable outer electrode. The transducer is the same type as was described previously with respect to the prior art circuit shown in FIG. 1B. The major drawback of this type of transducer when used with the prior art circuit was the extremely non-linear output response as shown in FIG. 2. Even restricted to the range of 0 to −100 $\mu$m, the non-linearity error as a percentage of the reading versus a straight line curve, fitted to −100 and 0 $\mu$m, is almost 50% near 0 $\mu$m displacement. The circuit of the current invention eliminates most of the non-linearity by means of positive feedback from the synchronous demodulator outputs of switch 21 (SELECTED I/O CØ, C1) to drive electrode 12 drive signal (switch 21 COM I/O A) via signal storage capacitors 41, 42, differential amplifier 43, amplifier 46, and switch 21 SELECTED I/O AØ. Note that the connections between signal storage capacitors 41, 42, and amplifier 43 have been reversed, so that capacitor 41 is now connected to the non-inverting input of amplifier 43, and capacitor 42 is connected to the inverting input. This creates a positive feedback where the drive signal amplitude applied to drive electrode 12 is increased by output/feedback voltage 47. As shown, the circuitry produces a negative output voltage. A positive output signal is available by simply using the output of amplifier 43 as the output signal of the circuit. Capacitor 45 has been replaced by resistor 48, so that the integrating amplifier of the first preferred embodiment is now an ordinary amplifier. The key to correct operation of the circuit in minimizing the non-linearity is the loop gain. Note that buffer amplifier 17 is now a unity gain amplifier. The gain of amplifier 46 is adjusted by changing the values of resistors 44 and/or 48 to obtain the best linearity. Simulation indicates that with perfect components, the ideal total amplifier gain in the feedback loop, that is, the product of the gains of all the amplifiers in the feedback loop (buffer amplifier 17, differential amplifier 43 and amplifier 46, in this case) would be unity, but losses in the synchronous demodulator section of switch 21, and parasitic capacitance, result in an actual required gain of about 1.2 to 1.4, for best linearity. Resistors 49, 50 are optional, their purpose being to increase the range of the output voltage by shifting it towards or into the unused polarity, since without the offset resistors, the output is always one polarity. The gain can be introduced in any of the loop components, but Amplifier 46 is the most convenient. The noise of the circuit could be reduced slightly by placing the gain in buffer amplifier 17, but the improvement is small, due to the small value of the required gain. If the gain is placed in buffer amplifier 17 or differential amplifier 43, amplifier 46 could be eliminated, if the offset adjust function of resistors 49, 50 is not required.

Although the circuit is shown with the 5V reference applied to switch 21 SELECTED I/O A1 from amplifier 28, slightly better noise performance (at slightly higher circuit cost) would be obtained by including amplifiers 31, 35 and the associated resistors 32, 33, 36, 37 and capacitors 34, 38 as illustrated in FIG. 3.

All of the improvements disclosed in the description of the first preferred embodiment, with the exception of the increased gain in amplifier 17, may be applied to the second preferred embodiment as well. The same printed circuit boards may be used for both embodiments, by including positions for resistors 49, 50, and installing a few different components depending on which embodiment is desired:

For the first embodiment, for use with transducer 10A, install components as shown in FIG. 3, and install resistor 50 or a conductive jumper in its place. Do not install resistor 49. To convert to the second embodiment, for use with transducer 10B, install resistor 49 (and 50 if jumpered). Remove resistor 23. Resistor 24 may be left in place or replaced by a jumper. Remove capacitor 45 and replace with resistor 48. Use cable 55 to reverse the connections between signal storage capacitors 41, 42 and the inputs to amplifier 43 by crossing one conductor over the other. Finally, transducer 10B is constructed without an equivalent pin to pin 213A as shown in FIG. 6 for the first embodiment. Instead, target electrode 13B is connected to ground by pin 214, which mates with receptacle 114 of circuit module 120. Receptacle 114 is connected to the ground of circuit module 120.

In the description of the first preferred embodiment, it was disclosed that certain components could be positioned on the outside of circuit module 60, to allow for adjustability. In the second preferred embodiment, this is required, unless the linearity requirement is not high. Linearity adjustment may be done by changing the value of resistor 44 or 48 after measuring the output voltage response curve (FIG. 2), and determining the required correction. To make adjustment easier, it is preferred to use a variable resistor. Very small variable surface mount resistors are available, in sizes of 3 mm square or even 2 mm square. One of these resistors may be located on shelf 66, which is the portion of the top surface of PCB 58 which protrudes beyond spacer 61 towards circuit module 120. This allows adjustment of the feedback gain with the circuit in operation. If fixed resistors are used, and replaced with new values until the correct gain is obtained, they may be positioned either on shelf 66 or on the bottom side of module 60. Access to the bottom side of module 60 requires it to be unplugged from the power supply/auxiliary equipment described previously, but soldering in new components should not be attempted with the power on anyway.

Figure 8:
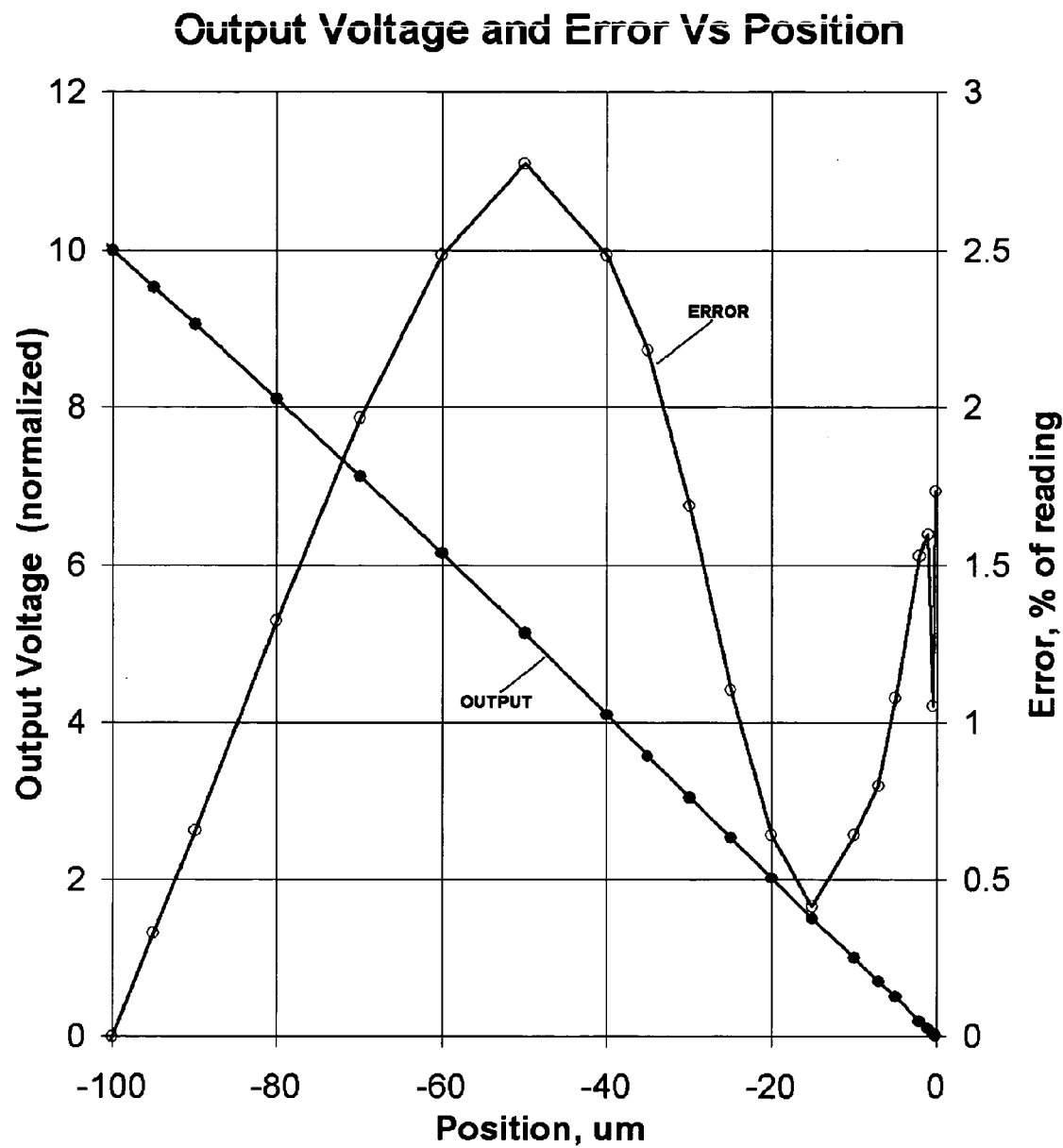
FIG. 8 shows the greatly increased linearity of the circuit of FIG. 7, compared to the circuit of FIG. 1B.

The gain of amplifier 46 is simply the resistance of resistor 48 divided by the resistance of resistor 44. As stated previously, this value is typically 1.2 to 1.4 for best linearity (this assumes the gain of amplifiers 17, 43 are both unity). The correct value depends on the ratio of the parasitic capacitance to transducer capacitance, transducer electrode parallelism, and losses in the synchronous demodulator. The disclosed range of 1.2 to 1.4 for the gain is valid for a 10 pF transducer capacitance and 2 to 3 pF parasitic capacitance (including input capacitance of amplifier 17). Significantly higher parasitic capacitance or lower transducer capacitance could require a higher gain. Higher transducer capacitance or lower parasitic capacitance could require a lower gain, but the lower limit for the required gain with no parasitic capacitance is unity. If the gain is lower than optimum, the output response flattens out as target electrode 13B is deflected away from pickup electrode 11, as shown in FIG. 2, following the curve from right to left. If the gain is correct, the curve will be very close to a straight line. If the gain is too high, the curve will be reversed, so that the curve peaks up and becomes increasingly greater than desired as target electrode 13B is deflected away from pickup electrode 11. FIG. 8 shows the output response of the second preferred embodiment of the circuit. The curve trace labeled "OUTPUT" appears to the unaided eye to be a nearly straight line, and is a dramatic improvement over the obviously curved response shown in FIG. 2. Plotting the non-linearity error in percent, as shown by the curve trace labeled "ERROR", shows a maximum non-linearity of 2.7%. This is good enough for many applications, but for precision measurement applications much better linearity is desired.

Figure 9:
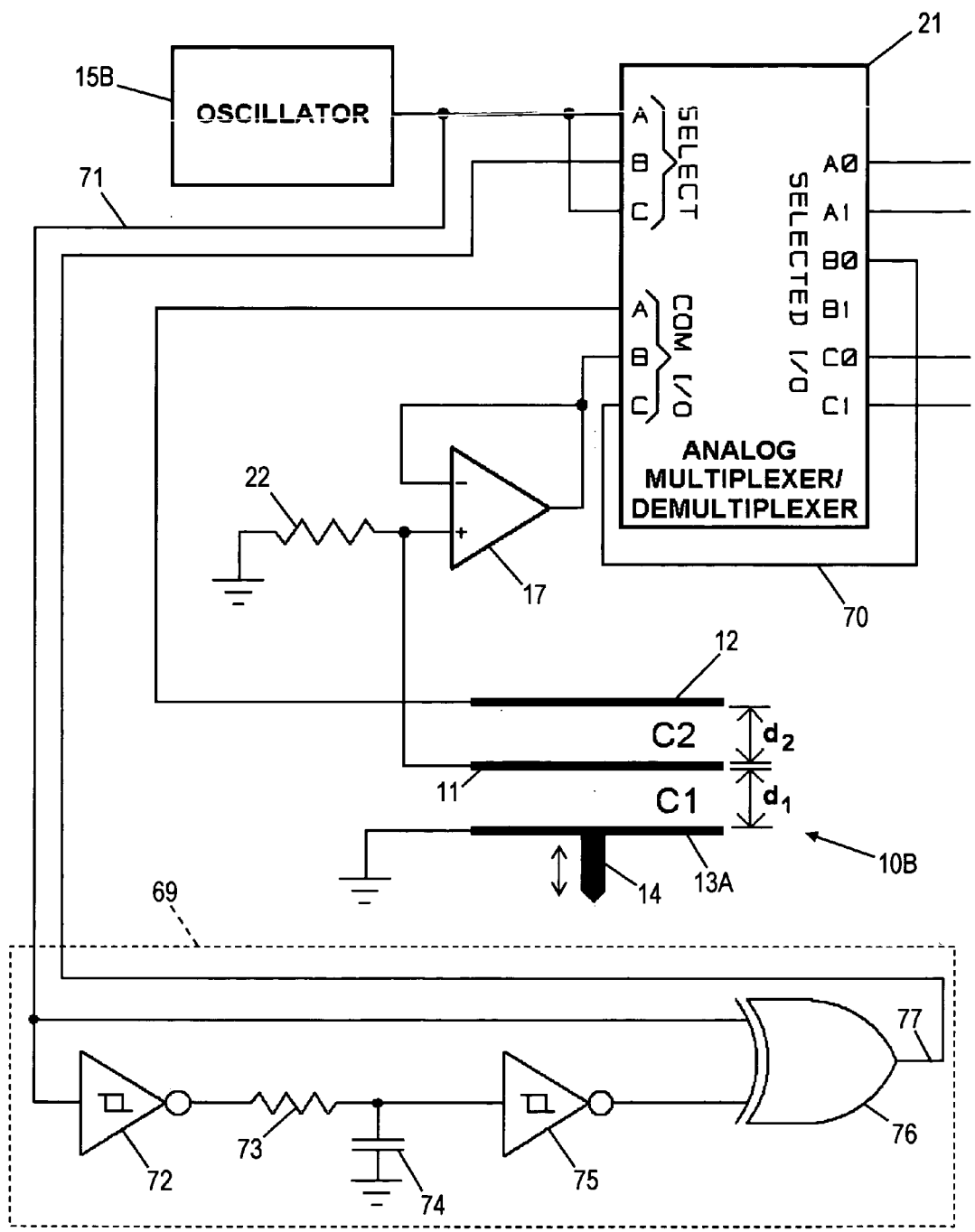
FIG. 9 shows a third embodiment of the circuit of this invention, which further improves on the embodiment of the circuit shown in FIG. 7.

In testing the circuit of the second preferred embodiment, it was determined that the residual non-linearity was due to switching spikes on the output of amplifier 17 during the transitions of oscillator 15B (actually at the transitions of the drive signal to drive electrode 12, which is controlled by oscillator 15B). A third preferred embodiment of the circuit of the current invention is shown in FIG. 9. Except as specified below, the circuitry of the third embodiment is the same as the second embodiment. The improvement in the circuit of the third embodiment over the second embodiment is due to the addition a blanking circuit.

The blanking circuit generates a dead-band during the switching of oscillator 15B, so that the output of buffer amplifier 17 is disconnected from both signal storage capacitors 41 and 42 during the time of switching of the drive electrode signals, plus enough time to allow the output of buffer amplifier 17 to settle to a stable value. The blanking circuit operates by using the previously unused B channel of switch 21. The output signal from buffer amplifier 17 is connected to switch 21 COM I/O B, rather than C. Blanking circuitry 69 controls SELECT input B of switch 21, so that during the switching period when the buffer amplifier signal is corrupted by switching transients, switch 21 connects COM I/O B to SELECTED I/O B1, which is left open, so that the corrupted signal is discarded. During the rest of the time, not near the time of switching of OSCILLATOR 15B which controls switching of the drive signal applied to drive electrode 12, switch 21 connects COM I/O B to SELECTED I/O BØ, which is connected by the addition of connection 70 to COM I/O C, and so the circuit functions as in the previous case, with the improvement of eliminating the switching transients from the output signal of buffer amplifier 17.

Blanking circuit 69 has an input connected to oscillator 15B by connection 71 and an output connected to switch 21 SELECT input B by connection 77. The blanking circuit consists of inverter 72, resistor 73, capacitor 74, inverter 75, and exclusive or gate (XOR) 76. Under steady state conditions, both inputs to XOR 76 are the same regardless of the state (high or low) of oscillator 15B, since one input of XOR 76 is connected directly to oscillator 15B, and the other input is connected to a doubly inverted version of the output of oscillator 15B, which is the same as the output of oscillator 15B (except for a small delay, which does not matter in the steady state). The output of XOR 76 is high (the blanking pulse) when one and only one of the inputs is high.

The length of the blanking pulse is determined by the delay time in the transmission of the switching transition of oscillator 15B through inverter 72, the RC delay of resistor 73 and capacitor 74, and inverter 75. suitable values for resistor 73 and capacitor 74 are 1000 ohms and 47 pF, respectively. The delay of the inverters is only about 5 ns each, assuming standard high speed CMOS devices are used, so that the RC delay is the most significant portion of the blanking pulse width. A blanking pulse is generated at both the positive going and the negative going transitions of oscillator 15B. Schmitt inverters, such as the industry standard 74HC14 are preferred for inverter 72 and 75 due to their more well defined switching points, but standard inverters will also work.

Figure 10:
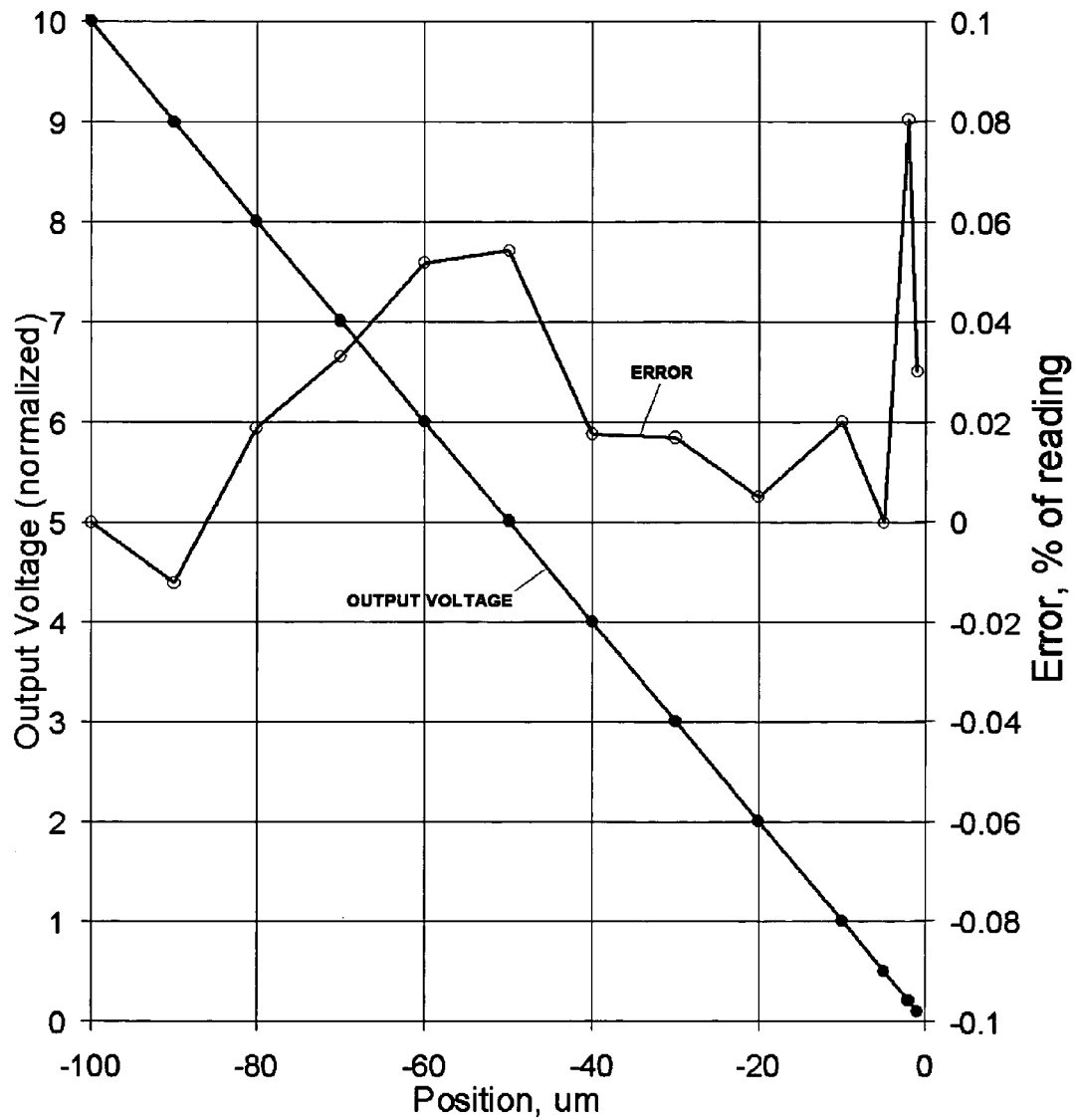
FIG. 10 shows the further improvement in linearity of the embodiment shown in FIG. 9, over the embodiment shown in FIG. 7.

FIG. 10 shows the output response of the same transducer and circuit used to generate the data recorded for FIG. 8, with the addition of the blanking circuit just described. The maximum error in the output signal, over the same range as before, is reduced from 2.7% to 0.08%, an improvement in linearity accuracy of almost 34 times. It should be noted that the blanking circuit can be used to improve the circuit of the first preferred embodiment as well, but the cost is slightly greater as a fourth switch channel is required, and the 74HC4053 used for switch 21 has only three channels, requiring an additional part. Also, the improvement is much less dramatic, as the negative feedback which keeps the pickup electrode voltage near zero greatly reduces the switching spikes on the output of amplifier 17. Nevertheless, if the best possible linearity is required, the improvement from the blanking circuit could be significant.

While the circuit of the current invention has been described in specific detail for three preferred embodiments, those skilled in the art will recognize that the invention can be practiced with modification within the scope of the appended claims. For example, the second two preferred embodiments are described with the feedback gain being associated with amplifier 46, but the gain could be located in any part of the feedback loop, such as amplifier 43 or amplifier 17 as well, or distributed among the various amplifiers, or additional amplifiers could be added. The grounded target electrode 13B may not need a specific connection to ground if the area of electrode 13B is sufficiently large with respect to the area of pickup electrode 11, so that electrode 13B is virtually grounded by means of parasitic capacitance. It is also possible to use a connection to the power supply(s) as the reference voltage output(s), rather than using a dedicated voltage reference, although the noise level of the circuit will be significantly increased by this modification. As a last example, it is possible to include the function of integrator 46 within differential amplifier 43 in the first preferred embodiment, although this is not generally desirable as doing so requires two extremely well matched capacitors in order to achieve a high CMRR.

I claim:

1. A high performance drive circuit for a capacitive transducer, said capacitive transducer including a pickup electrode and a first drive electrode, said pickup electrode having an associated voltage, said drive circuit including:

oscillator means including an oscillator signal;

voltage reference means including a first reference voltage output;

buffer amplifier means including an output signal responsive to the pickup electrode voltage;

synchronous demodulator means including first and second output signals responsive to said output signal of said buffer amplifier means;

first and second signal storage capacitors, each of said capacitors storing an individual output signal of said first and second output signals of said synchronous demodulator means;

differential amplifier means including an output responsive to the signals stored on said signal storage capacitors;

feedback generator means including a feedback signal responsive to said output of said differential amplifier means; and a first drive signal, said first drive signal having an amplitude equal to the difference between said first voltage reference output and said feedback signal, and said first drive signal being synchronized in time with said oscillator signal, said first drive signal being operative on said first drive electrode.

2. The drive circuit of claim 1, wherein said capacitive transducer further includes a second drive electrode, said second drive electrode being fixed with respect to said first drive electrode, said pickup electrode being movable with respect to both drive electrodes, said drive circuit further including:

a second reference voltage output associated with said voltage reference means, the polarity of said second reference voltage output being opposite the polarity of said first reference voltage output;

a second drive signal having an amplitude equal to the difference between said second reference voltage output and said feedback signal, said second drive signal being 180 electrical degrees out of phase with said first drive signal, and said second drive signal being operative on said second drive electrode;

wherein said feedback generator means includes an integrator; and wherein the polarity of said feedback signal is pre-determined such that the amplitude of said pickup electrode voltage is reduced to essentially zero.

3. The drive circuit of claim 2, wherein the voltage gain of said buffer amplifier means is substantially greater than unity.

4. The drive circuit of claim 2, wherein the voltage gain of said buffer amplifier means is greater than 5.

5. The drive circuit of claim 2, wherein the noise of said voltage reference means is reduced by noise reduction means comprising a low pass filter.

6. The drive circuit of claim 5, wherein said low pass filter includes a resistor, a capacitor, and a non-inverting buffer amplifier.

7. The drive circuit of claim 6, wherein said noise reduction means further includes:

a first inverting amplifier including a second low pass filter and an output, wherein the output of said first inverting amplifier constitutes said first reference voltage output; and a second inverting amplifier including a third low pass filter and an output, wherein the output of said second inverting amplifier constitutes said second reference voltage output.

8. The drive circuit of claim 2, further including a first single pole double throw analog switch, and a second single throw double pole analog switch;

wherein the analog switches are controlled by the logic state of said oscillator signal; and wherein said first drive signal is generated by means of the first analog switch and said second drive signal is generated by means of the second analog switch.

9. The drive circuit of claim 8, wherein said synchronous demodulator means comprises a third single pole double throw analog switch controlled by the logic state of said oscillator.

10. The drive circuit of claim 9, wherein all three of said single pole double throw analog switches are packaged in a single integrated circuit.

11. The drive circuit of claim 10, wherein said single integrated circuit is a 74HC4053 triple 2-channel analog multiplexer/demultiplexer.

12. The drive circuit of claim 1, wherein:

said capacitive transducer further includes a grounded target electrode, the target electrode being movable with respect to said pickup electrode, and said pickup electrode being fixed with respect to the drive electrode;

said feedback generator means includes an amplifier with a voltage gain such that the total amplifier gain is in the range from about 1 to about 2; and the polarity of said feedback signal is pre-determined such that the amplitude of said drive signal is increased by the output signal of said buffer amplifier means;

thereby forming a positive feedback loop which introduces a non-linearity that tends to cancel a non-linearity inherent in said capacitive transducer.

13. The drive circuit of claim 12, wherein the noise of said reference voltage output is reduced by noise reduction means comprising a low pass filter.

14. The drive circuit of claim 13, wherein said low pass filter comprises a resistor and a capacitor, said capacitor having a polyphenylene sulfide dielectric, whereby the temperature sensitivity of said low pass filter is reduced.

15. The drive circuit of claim 13, wherein:

said low pass filter comprises a resistor, a capacitor, and a non-inverting buffer amplifier; and the output of said non-inverting buffer amplifier constitutes said reference voltage output.

16. The drive circuit of claim 13, wherein:

said low pass filter comprises a resistor, a capacitor, and a non-inverting buffer amplifier; and said voltage reference means further includes at least one inverting amplifier, at least one of said at least one inverting amplifier including an additional low pass filter and an output;

wherein the output of the inverting amplifier including the additional low pass filter constitutes said reference voltage output.

17. The drive circuit of claim 12, including a single pole double throw analog switch controlled by the logic state of said oscillator, wherein:

said drive signal is generated by means of the analog switch.

18. The drive circuit of claim 17, further including:

a second single pole double throw analog switch controlled by the logic state of said oscillator;

wherein said synchronous demodulator means comprises the second analog switch.

19. The drive circuit of claim 18, wherein all of said analog switches are packaged in a single integrated circuit.

20. The drive circuit of claim 19, wherein said single integrated circuit is a 74HC4053 triple 2-channel analog multiplexer/demultiplexer.

21. The drive circuit of claim 12, further including:
a single pole double throw analog switch controlled by the logic state of said oscillator,
wherein said synchronous demodulator means comprises the analog switch.

22. The drive circuit of claim 1, wherein the noise of said voltage reference means is reduced by noise reduction means comprising a low pass filter.

23. The drive circuit of claim 22, wherein said low pass filter comprises a resistor and a capacitor, said capacitor having a polyphenylene sulfide dielectric, whereby the temperature sensitivity of said low pass filter is reduced.

24. The drive circuit of claim 1, wherein said synchronous demodulator means comprises a single pole double throw analog switch controlled by the logic state of said oscillator.

25. The drive circuit of claim 1, wherein:
said output of said differential amplifier means is substantially responsive only to the difference between the signals stored on said signal storage capacitors, said output of said differential amplifier means being substantially non-responsive to the sum of the signals stored on said signal storage capacitors;
whereby any low frequency noise or interference imposed on said pickup electrode of said capacitive transducer, and transferred through said buffer amplifier means and said synchronous demodulator means to said signal storage means will be rejected by said differential amplifier means.

26. The drive circuit of claim 1, further including a first circuit module, a second circuit module, and a cable, wherein:
said first circuit module includes at least one component selected from the group consisting of said oscillator means, said buffer amplifier means, said synchronous demodulator means, and said signal storage means;
said second circuit module includes at least one component selected from the group consisting of said voltage reference means, said differential amplifier means, and said feedback generator means;
said first circuit module is located proximate said capacitive transducer;
said second circuit module is located distal said capacitive transducer;
said first circuit module and said second circuit module are interconnected by said cable;
whereby the turn on drift of said capacitive transducer is reduced by locating the majority of the heat generating components of said drive circuit at sufficient distance from said capacitive transducer such that the heat generated by said drive circuit does not impinge upon and influence said capacitive transducer; and
whereby the critical high frequency and high impedance circuitry of said drive circuit is located near said capacitive transducer, such that the corrupting influence of external interference sources and distance are minimized.

27. The drive circuit of claim 26, wherein said second circuit module comprises:
a printed circuit board, said printed circuit board having a top surface, a bottom surface, and a plurality of edges;
at least one hollow spacer;
a cover plate, said cover plate having a plurality of edges; and
wherein said printed circuit board, said at least one hollow spacer, and said cover plate are assembled forming a closed, hollow structure having an internal cavity.

28. The drive circuit of claim 27, wherein said edges of said cover plate extend slightly past said hollow spacer, thereby facilitating the ability of an operator to grip the module while docking or undocking it from a power supply or other auxiliary equipment.

29. The drive circuit of claim 27, wherein at least one of the edges of said printed circuit board extends beyond said hollow spacer, forming a shelf, said drive circuit further including at least one gain adjustment resistor, said gain adjustment resistor being mounted on said shelf.

30. The drive circuit of claim 27, wherein:
said internal cavity is filled with a potting material;
thereby improving the stability of said voltage reference means by shielding said voltage reference means from rapid temperature changes.

31. The drive circuit of claim 26, wherein said first circuit module further includes:
a first printed circuit board;
a first spacer;
a second spacer, the length of said second spacer being less than the length of said first spacer;
a second printed circuit board having an upper surface, a lower surface, and a plurality of edges, the lower surface containing a plurality of contact pads disposed near one edge, the length of said second printed circuit board being longer than the length of said second spacer;
wherein said cable is a ribbon cable, and said ribbon cable is attached to said contact pads of said second printed circuit board; and
wherein said first printed circuit board, said first spacer, said second spacer, and said second printed circuit board are assembled in a stack in the order recited, such that said ribbon cable attached to said second printed circuit board by said contact pads is sandwiched between said first spacer and said second printed circuit board;
thereby providing strain relief to said ribbon cable to prevent cracking of said attachment to said contact pads.

32. The drive circuit of claim 26, wherein said capacitive transducer includes a plurality of electrical connector pins, and said first circuit module further includes a first printed circuit board, a first spacer, a second spacer, a second printed circuit board, and a plurality of electrical receptacles, wherein:
said first and second printed circuit boards include a plurality of plated through via holes disposed thereon;
said first and second spacers include a plurality of holes disposed thereon, said holes cooperating with said plated through via holes of said printed circuit boards;
wherein said first printed circuit board, said first spacer, said second spacer, and said second printed circuit board are assembled in a stack in the order recited; and
said plurality of electrical receptacles are inserted through said plated through via holes of said printed circuit boards and said holes of said spacers, said electrical receptacles being soldered in place to said plated through via holes;
thereby providing both electrical and mechanical interconnect means between said first circuit module and said capacitive transducer via said electrical connector pins and said electrical receptacles, with the length of the electrical interconnection being minimized to reduce the extent of exposed high impedance circuitry subject to electrical interference.

33. A high performance drive circuit for a capacitive transducer, said capacitive transducer including a pickup electrode and a first drive electrode, said pickup electrode having an associated voltage, said drive circuit including:
oscillator means including an oscillator signal having switching transitions;
voltage reference means including a first reference voltage output;
buffer amplifier means including an output signal responsive to the pickup electrode voltage;
synchronous demodulator means including an input, a first output and a second output, wherein said first and second outputs are responsive to said input under the control of said oscillator signal;
a first signal storage capacitor responsive to said first output of said synchronous demodulator means;
a second signal storage capacitor responsive to said second output of said synchronous demodulator means;
differential amplifier means including an output responsive to the signals stored on said first and second signal storage capacitors;
feedback generator means including a feedback signal responsive to said output of said differential amplifier means;
a first drive signal, said first drive signal having an amplitude equal to the difference between said first voltage reference output and said feedback signal, and said first drive signal being synchronized in time with said oscillator signal, said first drive signal being operative on said first drive electrode; and
blanking circuit means including a blanking pulse active proximate said switching transitions of said oscillator signal, said blanking circuit means operative to provide transmission of said output signal of said buffer amplifier means to said input of said synchronous demodulator means when said blanking pulse is inactive, and to block transmission of said output signal of said buffer amplifier means to said input of said synchronous demodulator means when said blanking pulse is active;
whereby switching spikes in said output signal of said buffer amplifier means during said switching transitions of said oscillator signal are isolated from said signal storage capacitors, so that such disturbances do not degrade the accuracy of said drive circuit.

34. The drive circuit of claim 33, wherein said capacitive transducer further includes a second drive electrode, said second drive electrode being fixed with respect to said first drive electrode, said pickup electrode being movable with respect to both drive electrodes, said drive circuit further including:
a second reference voltage output associated with said voltage reference means, the polarity of said second reference voltage output being opposite the polarity of said first reference voltage output;
a second drive signal having an amplitude equal to the difference between said second reference voltage output and said feedback signal, said second drive signal being 180 electrical degrees out of phase with said first drive signal, and said second drive signal being operative on said second drive electrode;
wherein said feedback generator means comprises an integrator; and
the polarity of said feedback signal is pre-determined such that the amplitude of said pickup electrode voltage is essentially reduced to zero.

35. The drive circuit of claim 33, wherein:
said capacitive transducer further includes a grounded target electrode, the target electrode being movable with respect to said pickup electrode, and said pickup electrode being fixed with respect to the drive electrode;
said feedback generator means includes an amplifier such that the total amplifier gain is in the range from about 1 to about 2; and
the polarity of said feedback signal is pre-determined such that the amplitude of said drive signal is increased by the output signal of said buffer amplifier means;
thereby forming a positive feedback loop that introduces a non-linearity that tends to cancel a non-linearity inherent in said capacitive transducer.

36. The drive circuit of claim 35, wherein:
said blanking circuit means further includes an analog switch having an input and an output;
said analog switch is controlled by said blanking pulse;
said input of said analog switch is connected to said output of said buffer amplifier means;
said output of said analog switch is connected to said input of said synchronous demodulator means;
said analog switch provides said transmission of said output signal of said buffer amplifier means to said input of said synchronous demodulator means when said blanking pulse is inactive; and
said analog switch blocks said transmission of said output signal of said buffer amplifier means to said input of said synchronous demodulator means when said blanking pulse is active.

37. A high performance drive circuit for capacitive transducers, said circuit including:
an oscillator;
a voltage reference, said voltage reference including a positive output and a negative output, further including noise reduction means comprising at least one low pass filter, said low pass filter having a cutoff frequency of less than 20 Hz, whereby the noise at the outputs of said voltage reference is reduced;
a buffer amplifier, said buffer amplifier having a voltage gain significantly greater than unity, whereby the noise contribution of circuitry subsequent to said buffer amplifier is reduced by a factor equal to the gain of said buffer amplifier;
signal storage means comprising two capacitors;
differential amplifier means, said differential amplifier means including an output responsive to the difference between the signals stored on the two capacitors of said signal storage means, said output of said differential amplifier means further being substantially non-responsive to the sum of the signals stored on the two capacitors of said signal storage means;
synchronous demodulator means including two outputs responsive to the output signal of said buffer amplifier, the signal of each of said outputs being stored on one of said two capacitors of said signal storage means, the timing of said synchronous demodulator means being controlled by said oscillator;
a feedback signal, said feedback signal being generated by integrator means responsive to the output signal of said differential amplifier means; and
two drive signals, a first drive signal having an amplitude equal to the difference between the positive output of said voltage reference and said feedback signal, and a second drive signal having an amplitude equal to the difference between the negative output of said voltage reference and said feedback signal.

38. The drive circuit of claim 37, wherein said synchronous demodulator means includes a single pole double throw analog switch.

39. The drive circuit of claim 37, further including two single pole double throw analog switches, each switch including an output and two inputs, a first input of a first switch being connected to said positive output of said voltage reference, a second input of said first switch being connected to said feedback signal, and said output of said first switch constituting said first drive signal, a first input of a second switch being connected to said negative output of said voltage reference, a second input of said second switch being connected to said feedback signal, and said output of said second switch constituting said second drive signal.

40. The drive circuit of claim 39, wherein said synchronous demodulator means includes a single pole double throw analog switch.

41. The drive circuit of claim 40, wherein all of said analog switches are contained in a single integrated circuit.

42. The drive circuit of claim 41, wherein said single integrated circuit is a 74HC4053 triple 2-channel analog multiplexer/demultiplexer.

* * * * *